ated Patent [19]

Vollkommer et al.

[11] 3,915,936
[45] Oct. 28, 1975

[54] PROCESS FOR THE PRODUCTION OF UNSATURATED POLYESTER RESINS

[75] Inventors: Norbert Vollkommer, Troisdorf; Gerhard Schade, Witten-Bommern; Wolfgang Wolfes, Niederkassel-Mondorf, all of Germany

[73] Assignee: Dynamit Nobel Aktiengesellschaft, Germany

[22] Filed: Sept. 11, 1974

[21] Appl. No.: 505,012

[30] Foreign Application Priority Data

Sept. 29, 1973 Germany............................ 2349115

[52] U.S. Cl.......... 260/75 R; 260/47 C; 260/75 UA; 260/861
[51] Int. Cl.².................... C08G 63/14; C08G 63/52
[58] Field of Search......... 260/75 RC, 75 UA, 47 C, 260/861

[56] References Cited
UNITED STATES PATENTS 2,720,504  10/1955  Caldwell et al. .................. 260/75 R
2,978,347  4/1961  Koehler et al. ............... 260/429.3 X
3,326,965  6/1967  Schultheis et al. ................. 260/75 R
3,631,153  12/1971  Carter et al. ....................... 260/75 R

FOREIGN PATENTS OR APPLICATIONS 616,490  10/1962  Belgium

OTHER PUBLICATIONS

Loehr et al., Mackromol. Chem., 117 (1968), pp. 283–289.
Bhadani et al., J. Polym. Sci., Part A–1, (1970), 8(1), pp. 225–235.

*Primary Examiner*—Melvin Goldstein
*Assistant Examiner*—W. C. Danison, Jr.
*Attorney, Agent, or Firm*—Craig & Antonelli

[57] ABSTRACT

A process for producing unsaturated polyester resins from conventionally employed unsaturated and optionally saturated dicarboxylic acids and polyhydric alcohols wherein the esterification catalyst employed is an alkali tetraphenylborate or a zirconate of 2-alkyl-1,3-hexanediol or 2,2-dialkyl-1,3-hexanediol wherein the alkyl groups contain 1 to 4 carbon atoms.

7 Claims, No Drawings

PROCESS FOR THE PRODUCTION OF UNSATURATED POLYESTER RESINS

Unsaturated polyesters (called UP resins hereinbelow) based on unsaturated as well as optionally saturated dicarboxylic acids or the polyester-forming derivatives thereof and polyhydric, preferably dihydric alcohols are conventional. As the unsaturated dicarboxylic acids, maleic acid and/or the anhydride thereof, as well as fumaric acid, are almost exclusively utilized. Preferred saturated dicarboxylic acids are ortho-or isophthalic acid or terephthalic acid, or adipic acid, or mixtures thereof.

Suitable dihydric alcohols are, in particular, ethylene glycol, 1,2-propanediol, as well as neopentyl glycol. The molecular weights $M_{GPC}$ (determined by gel permeation chromatography) of standard UP resins range between 1,500 and 5,000, preferably between 1,800 and 2,600. UP resins having an increased heat distortion stability in the cured condition contain, as the dicarboxylic acid components, in addition to maleic and-/or fumaric acid preferably terephthalic acid or isophthalic acid, or hexahydrophthalic acid, and as the polyhydric alcohols preferably neopentyl glycol or 1,4-bis(hydroxymethyl) cyclohexane or 4,4'-bis($\beta$-hydroxyethoxy)bisphenol A. Also, the molecular weights thereof, determined by gel chromatography, are preferably in the range of 2,500 – 3,500, i.e. above 700 – 900 higher than the preferred range in the standard UP resins.

The UP resins are preferably employed as casting resins for the production of a great variety of molded articles. For this purpose, they are generally dissolved in a reactive monomer, preferably styrene, and then copolymerized under cross-linking (cured) after the addition of radical-forming agents and optionally fillers, and are then subjected to a final curing step, if desired. Suitable radical-forming agents (polymerization catalysts) are, for example, peroxides, preferably dibenzoyl peroxide by itself or in a mixture with tertiary amines, e.g. dimethylaniline.

The UP resins are preferably produced by the method of melt condensation or azeotropic condensation, the latter being carried out in the presence of azeotropic agents which are waterimmiscible, for the water of condensation.

If dicarboxylic acid esters are utilized as the acid components, such as dimethyl terephthalate or dimethyl isophthalate, they are suitably first interesterified with the polyhydric alcohols and only thereafter polycondensed after the interesterification has taken place, with the residual acid components. The interesterification takes place in a conventional manner in a temperature range of 140°–200°C., preferably 150°–180°C. with the use of known interesterification catalysts, such as lead dioxide, zinc acetate, or manganese acetate. After adding the residual dicarboxylic acid components, especially maleic anhydride and/or fumaric acid, the polycondensation is continued to the end up to the desired molecular weight by temperature elevation to maximally 240°C., preferably 200°–230°C.

In order to accelerate the polycondensation, esterification catalysts have been suggested. Suitable catalysts are acids or bases. However, these catalysts are not always sufficiently effective and often have disadvantageous effects on the properties of the UP resins; thus, mineral acids result in an undesired discoloration and in a reduction of the shelf stability of the UP resin solution in styrene. Besides, these catalysts exert a negative influence on the speed of the cold-curing process.

For these reasons, esterification catalysts are frequently omitted and prolonged polycondensation periods are tolerated. In cases where components are present which are more difficult to esterify, such as isophthalic acid, for example, the polycondensation time is, however, considerably increased. A considerable extension of the polycondensation reaction period is furthermore caused by tetrachloro-p-xylylene glycol, as well as tetrachloro-m-xylylene glycol, which when incorporated by condensation in minor quantities of a few molar percent (e.g. 5 mol. %) already effect a considerable improvement in the properties of the cured UP resin, especially a considerable increase in heat distortion stability according to Martens or ISO/R 75;A (as hereinafter described in Comparative Example 1).

In order to shorten the polycondensation period, esterification catalysts proposed for UP resins include tetrabutyl titanate, tetrabutyl zirconate, or mixtures of tin (II) oxalate + zinc acetate (M.P. Stevens and J. P. Gardner, Ind. Eng. Chem. 4 (1965), "Process Design and Development," p. 67). These known esterification catalysts have been unable to solve the problem of also shortening the polycondensation time of difficult to esterify components while avoiding disadvantageous effects on the UP resins and/or the solutions thereof.

Experiments have shown that these prior-art esterification catalysts have considerable disadvantages (Comparative Examples 2–4). Tetrabutyl titanate causes strong, orange to reddish brown discolorations of the UP resin, as well as of the UP resin solution. Additionally, particles of a yellowish brown color occur in the UP resin, as well as in the UP resin solution which apparently represent secondary products of the catalyst. Tetrapropyl zirconate, tetrabutyl zirconate, as well as mixtures of tin oxalate and zinc acetate cause strong turbidities of the styrene-UP resin solutions, with an activity markedly reduced as compared to the Ti compounds. Additionally, embedded particles occur in the UP resin melt, which partially at least are secondary catalyst products and which are dispersed, during the dissolution of the UP resin in styrene, as voluminous particles.

The processor demands clear or, at most, only slightly turbid UP resin solutions. Thus, the dispersed particles would have to be separated by centrifuging or filtration, representing additional expenditure. Moreover, the shelf life of the styrene solution of certain UP resin recipes produced with the use of tetrabutyl zirconate or tetrapropyl zirconate as esterification catalyst is unsatisfactory (Comparative Example 5).

The present invention is based on the problem of avoiding the disadvantages of the heretofore conventional methods. This problem has been solved, according to the invention, by using, as the esterification catalysts during the production of unsaturated polyester resins, alkali tetraphenylborates of the formula

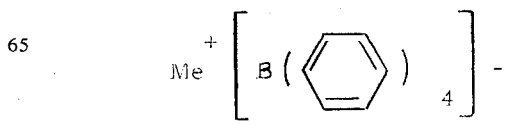

wherein Me⁺ represents $Li^+$, $Na^+$, $K^+$, $Rb^+$, or $Cs^+$, or by using zirconates of 2-alkyl-1,3-hexanediol or of 2,2-dialkyl-1,3-hexanediol, wherein the alkyl groups are of 1 to 4 carbon atoms.

Preferably, zirconates of 2-ethyl-1,3-hexanediol or 2,2-dimethyl-1,3-hexanediol are employed.

By means of the esterification catalysts utilized in accordance with the present invention, the polycondensation period during the production of the unsaturated polyester resins can be shortened by more than one-half. It is possible to prepare UP resins with higher molecular weights which, in the cured condition, exhibit better mechanical properties. Also, with the use of components which are difficult to esterify, such as, for example, isophthalic acid or the tetrachloroxylylene glycols, it is possible to reduce the polycondensation time to an economically interesting degree. At the same time, the disadvantageous effects on the UP resins and/or the solutions thereof, as they occurred heretofore in the conventional esterification catalysts, are avoided.

As compared to the titanates, the catalysts of this invention with an almost identical activity, exhibit the advantage that they permit the manufacture of colorless UP resins and colorless, transparent UP resin solutions. With respect to tetrabutyl or tetrapropyl zirconate (Comparative Example 3) or with respect to the catalyst system tin oxalate + zinc acetate (Comparative Example 4), there is the advantage of a greater activity displayed by the catalysts of this invention. As shown by Comparative Example 3, the known catalysts, in spite of zirconium content which is 3 times as high, do not exhibit the activity of the zirconium compounds employed according to this invention. Furthermore, no secondary catalyst products occur in the form of suspended substances in the UP resin melt or solution in styrene, as is the case especially with tetrapropyl and tetrabutyl zirconate and, to a minor extent, also with the catalyst system of tin oxalate + zinc acetate. Also, the shelf stability of the styrene solution of the UP resin is fully satisfactory (Example 4).

The potassium tetraphenylborate is prepared by precipitating an aqueous solution of commercially available sodium tetraphenylborate by addition of a soluble potassium salt such as KCL, $KNO_3$ or $K_2SO_4$, at a temperature ranging from 20°C. to 50°C.

The zirconate of the 2-alkyl-1,3-hexanediols or of the 2,2-dialkyl-1,3-hexanediols can be produced in a simple manner by the interesterification of commercially available tetrapropyl or tetra-n-butyl zirconate with one of the 2-alkyl-1,3-hexanediols or with one of the 2,2-dialkyl-1,3-hexanediols in a temperature range of 130°–210°C., preferably 150°–190°C., while removing the butanol or propanol from the equilibrium.

The molar ratio of tetrapropyl and/or tetra-n-butyl zirconate to the hexanediol ranges advantageously from 1 : 2 to about 1 : 10, preferably 1 : 6.

The esterification catalysts can be employed in amounts of from 0.01 to 5%, preferably from 0.02 to 0.5%, based on the total weight of reactants used in the polycondensation reaction.

If the condensation reaction proper is preceded by an interesterification, for example when using the terphthalic or isophthalic acid in the form of the alkyl esters thereof, e.g. dimethyl, diethyl or dibutyl esters, the esterification catalysts should be added advantageously after the interesterification, either together with the other dicarboxylic acid components still to be added, or after the partial esterification thereof.

The invention will be explained in greater detail with reference to the following examples.

EXAMPLE 1

Preparation of the Zirconate of 2-Ethyl-1,3-hexanediol

A reaction vessel equipped with an agitator as well as a descending cooler is charged with 38.3 g. (0.1 mole) of tetrabutyl zirconate and 90 g. (0.62 mole) of 2-ethyl-1,3-hexanediol. Under agitation and while passing a weak nitrogen stream through the reaction mixture, the mixture is gradually heated. At a bath temperature of 155°C., the interesterification commences, with butanol being split off. In the temperature range from 155°C. to 180°C., 28 g. of n-butanol passes over. The reaction product (98 g.), a colorless, viscous paste (Zr content about 9% by weight), is suspended in the same amount by weight of 2-ethyl-1,3-hexanediol to facilitate the metering of the mixture. It is not necessary to use the corresponding hexanediol as a dispersant. It doesn't serve as a part of the catalyst and can easily be replaced by ethylene glycol, 1,2-propanediol or 1,4-butanediol.

The zirconate of 2,2-dimethyl-1,3-hexanediol is produced in the same manner.

Comparative Example 1

Preparation of a UP Resin without Esterification Catalyst 72.8 g. (0.7 mole) of neopentyl glycol, 16.2 g. (0.26 mole) of ethylene glycol, as well as 13.8 g. (0.05 mole) of 2,3,4,6-tetrachloro-m-xylylene glycol are interesterified for 1.5 hours, with the addition of 0.080 g. of lead dioxide as the interesterification catalyst, with 69.5 g. (0.36 mole) of dimethyl terephthalate in a temperature range of 150°–180°C. and a pressure of 760 mm. Hg, while passing a weak nitrogen stream through the reaction vessel.

Thereafter, 6.6 g. (0.04 mole) of isophthalic acid is added thereto and the esterification step is conducted for 0.5 hours at 180°C. and also for 1 hour at 200°C. Subsequently, 69.6 g. (0.6 mole) of fumaric acid and 48 mg. hydroquinone (as the polymerization inhibitor) are added to the reaction mixture, and the latter is polycondensed for 1 hour at 200°C. and for 6.5 hours at 220°C. and a pressure of 760 mm. Hg.

After 6.5 hours at 220°C., the polycondensation is stopped. During the polycondensation at 220°C., samples of the UP resin melt are withdrawn after respectively 4.5 hours, 5 hours, and 5.5 hours, and the molecular weight of these samples are determined in tetrahydrofuran by gel chromatography. The molecular weight $M_{GPC}$ is as follows:

| | |
|---|---|
| after 4.5 hours at 220°C. | 2,000 |
| after 5 hours at 220°C. | 2,100 |
| after 5.5 hours at 220°C. | 2,200 and |
| after 6.5 hours at 220°C. | 2,500 |

Without an esterification catalyst, the reaction mixture would thus have to be polycondensed for about 6 hours to attain a molecular weight lying at the lower limit for UP resins with heat distortion stability.

EXAMPLE 2

Zirconate of 2-Ethyl-1,3-hexanediol as the Esterification Catalyst 72.8 g. (0.7 mole) of neopentyl glycol, 16.2 g. (0.26 mole) of ethylene glycol, as well as 13.8 g. (0.05 mole) of 2,3,4,6-tetrachloro-m-xylylene glycol are interesterified, with the addition of 0.08 g. of lead dioxide as the interesterification catalyst, with 69.5 g. (0.36 mole) of dimethyl terephthalate in the temperature range of 150°–180°C. for 1.5 hours while passing a weak nitrogen stream through the reaction vessel.

Then, 6.6 g. (0.04 mole) of isophthalic acid, as well as 0.1 g. of the zirconate of 2-ethyl-1,3-hexanediol produced as described in Example 1, dispersed in 0.1 g. of 2-ethyl-1,3-hexanediol, as the esterification catalyst, are added thereto, and the esterification is carried out for 0.5 hours at 180°C. and for 0.5 hours at 200°C. under a pressure of 760 mm. Hg. The catalyst concentration, based on the total weight of reactans, including the fumaric acid, is 0.04% by weight, and the composition of the UP resin is the same as in Comparative Example 1.

Subsequently, 69.6 g. (0.6 mole) of fumaric acid, as well as 0.048 g. of hydroquinone are added to the reaction mixture and the latter is polycondensed for 1 hour at 200°C. and for 3 hours at 220°C. at a pressure of 760 mm. Hg. After termination of the polycondensation, the molecular weight of the UP resin is determined by gel chromatography in THF, yielding $M_{GPC} = 3,200$.

The accelerating activity of the esterification catalyst can clearly be seen in the fact that, without a catalyst, only a molecular weight of 2,500 had been reached in 6.5 hours (Comparative Example 1).

EXAMPLE 3

Potassium Tetraphenylborate as Esterification Catalyst

With the use of the same condensation components as in Example 2 and with the same process technique, 0.1 g. (0.04% by weight based on the total weight reactants) of potassium tetraphenylborate was used as the esterification catalyt in place of the zirconate.

The polycondensation was interrupted, as in Example 2 after an operating period of 3 hours at 220°C., and the molecular weight was determined in THF by gel chromatography, yielding $M_{GPC} = 3,000$.

Comparative Examples 2 - 4

Using the same condensation components as in Examples 2 and 3, and with the same mode of operation, several already described esterification catalysts were utilized in place of the catalysts of this invention. The polycondensation time at 220°C. was in each case 3 hours; the added amount of catalyst was respectively 0.1 g., corresponding to 0.04% by weight.

| Comparative Example | Catalyst | $M_{GPC}$ of UP Resin | Remarks |
|---|---|---|---|
| 2 | Tetra-n-butyl titanate | 3,200 | (1) |
| 3 | Tetra-n-butyl zirconate | 2,800 | (2) |
| 4 | Sn (II) oxalate + Zn acetate (molar ratio 3:1) | 2,700 | (3) |

1. UP resin and UP resin solution in styrene (60/40) show a yellowish brown discoloration and contain yellowish brown particles occluded and/or dispersed therein.
2. UP resin is turbid and has occluded yellowish brown particles; the styrene solution is strongly turbid and contains voluminous yellowish brown particles dispersed therein.
3. UP resin is turbid; the sytrene solution is strongly turbid and contains small, light yellow particles dispersed therein.

The advantages of the esterification catalysts of this invention as compared to the already known catalysts can be seen particularly clearly from a comparison of the results of the comparative examples with those of Examples 2 and 3.

EXAMPLE 4

93.6 g. (0.9 mole) of neopentyl glycol and 27.6 g. (0.1 mole) of 2,3,4,6-tetrachloro-m-xylylene glycol is interesterified, with the addition of 0.094 g. of lead dioxide, with 69.8 g. (0.36 mole) of dimethyl terephthalate in a temperature range of 150°–180°C. while passing a weak nitrogen stream through the reaction vessel. Thereafter, 6.6 g. (0.04 mole) of isophthalic acid and 0.046 g. of hydroquinone are added, and the mixture is condensed for 1 hour at 180°C. and for 1 hour at 200°C. Then, 69.6 g. (0.6 mole) of fumaric acid and 0.12 g. of the zirconate of 2,2-dimethyl-1,3-hexanediol (0.05% of catalyst, based on the total weight of reactants are added thereto, and the mixture is polycondensed for 1 hour at 200°C. and for 3 hours at 220°C. The UP resin has a molecular weight of 3,100, determined by gel chromatography in THF.

The UP resin is dissolved in an amount of 60 parts by weight in 40 parts by weight of styrene. The sytrene solution, showing only an extremely slight turbidity, is divided. One portion of the solution is cured with 2% by weight of dibenzoyl peroxide paste (50% strength) and 0.03 volume % of dimethylaniline in a mold to plates of a thickness of 4mm. The transparent, colorless cast articles have the following mechanical properties after a final curing step at 135°C. for 4 hours.

| | |
|---|---|
| Vicat temperature: | >200°C. |
| Heat distortion stability: | |
| according to Martens | 133°C. |
| according to ISO/R 75; A | 149°C. |
| Impact resistance | 8.3 cm·kp/cm² |

Another portion of the styrene solution is stored for 8 weeks in a temperature range from 20°C to 30°C.; no change in the solution occurs during this period.

Comparative Example 5

With the use of the same condensation components and the same operating conditions as described in Example 4, 0.12 g. of tetrabutyl zirconate (=0.05% by weight) is utilized as the esterification catalyst, and the polycondensation time is increased at 220°C. from 3 hours, as in Example 4, to 4 hours. A cloudy UP resin is thus obtained with embedded yellowish brown particles, having a molecular weight (GPC) of 2,900.

This resin is dissolved in an amount of 60 parts by weight in 40 parts by weight of styrene. The opaque styrene solution, containing yellowish brown swollen particles, is cured as in Example 4 to provide plates with a thickness of 4 mm. The turbid castings, subjected to a final curing step at 135°C., which contain yellowish brown occlusions have the following mechanical properties:

| | |
|---|---|
| Vicat temperature: | >200°C. |
| Heat distortion stability: | |
| according to Martens | 121°C. |
| according to ISO/R 75; A | 140°C. |
| Impact resistance: | 5.8 cm·kp/cm² |

Another portion of the styrene solution is stored in a temperature range of 20°–30°C. Already after 14 days, the solution has gelled, as contrasted to the solution obtained in Example 4.

EXAMPLE 5

72.8 g. (0.7 mole) of neopentyl glycol and 19.8 g. (0.32 mole) of ethylene glycol are interesterified, with the addition of 0.082 g. of lead dioxide, with 69.8 g. (0.36 mole) of dimethyl terephthalate at 180°C. for 1 hour. Then, 6.6 g. (0.04 mole) of isophthalic acid and 0.15 g. of sodium tetraphenylborate are added thereto (=0.06% by weight, based on the total weight of reactants including the fumaric acid) and the mixture esterified for ½ hour at 180°C. and for ½ hour at 200°C. Subsequently, 69.6 g. (0.6 mole) of fumaric acid and 0.045 g. of hydroquinone are added, and the mixture is polycondensed for 1 hour at 200°C. and for 3 hours at 220°C. A transparent UP resin is obtained having a molecular weight of 3,200, determined by gel chromatography.

The cast articles, obtained after dissolution in styrene (60 parts by weight of resin; 40 parts by weight of styrene) and curing, as well as final curing, as described in Example 4, have a Vicat temperature of >200°C., a heat distortion stability according to Martens of 115°C., according to ISO/R 75; A of 135°C., and an impact resistance of 6.9 cm·kp/cm².

Comparative Example 6

With the use of the same condensation components as in Example 5, the polycondensation was conducted without an esterification catalyst, and the polycondensations were carried out for 6 hours at 220°C., instead of a period of 3 hours at this temperature. The UP resin only had a molecular weight $M_{GPC}$ of 2,600, in spite of a polycondensation time at 220°C. which was twice as long as in Example 5.

The resin (60 parts by weight) is dissolved in 40 parts by weight of styrene and cured to provide 4mm. thick plates as described in Example 4. Properties:

| | |
|---|---|
| Vicat temperature: | >200°C. |
| Heat distortion stability: | |
| according to Martens | 111°C. |
| according to ISO/R 75; A | 131°C. |
| Impact resistance: | 4.8 cm·kp/cm² |

EXAMPLE 6

72.8 g. (0.7 mole) of neopentyl glycol, 13.0 g. (0.21 mole) of ethylene glycol, and 14.4 g. (0.1 mole) of 1,4-bis(hydroxymethyl)-cyclohexane are interesterified at 180°C. for 1 hour, with the addition of 0.090 g. of lead dioxide, with 69.8 g. (0.36 mole) of dimethyl terephthalate. Then, 6.6 g. (0.04 mole) of isophthalic acid and 0.1 g. (=0.04% by weight, based on the total weight of reactants) of the zirconate of 2-ethyl-1,3-hexanediol as the esterification catalyst are added thereto, and the mixture is condensed for 0.5 hours at 180°C. and 0.5 hours at 200°C. Thereafter, 69.6 g. (0.6 mole) of fumaric acid and 0.045 g. of hydroquinone are added thereto and a polycondensation is conducted for 1 hour at 200°C. as well as for 3 hours at 220°C.

A colorless, transparent UP resin is obtained having a molecular weight $M_{GPC}$ of 3,700. 60 parts by weight of this resin is dissolved in 40 parts by weight of styrene and cured to plates of a thickness of 4 mm. as set forth in Example 4. After a final curing step (4 hours at 135°C.), the plates had the following mechanical properties:

| | |
|---|---|
| Vicat temperature: | >200°C. |
| Heat distortion stability: | |
| according to Martens | 131°C. |
| according to ISO/R 75;A | 145°C. |
| Impact resistance: | 7.0 cm·kp/cm² |

Comparative Example 7

According to the same recipe set forth in Example 6, but without esterification catalysts and with the difference that the polycondensation was carried out, instead of for 3 hours at 220°C., in this case for 5.5 hours at 220°C., a UP resin had been obtained with a molecular weight $M_{GPC}$ of 2,100, determined by gel chromatography. The resin was dissolved to an amount of 60 parts by weight in 40 parts by weight of styrene, cured, and finally cured, as described in Example 4, yielding plates having a thickness of 4 mm. and exhibiting the following properties:

| | |
|---|---|
| Vicat temperature: | 200°C. |
| Heat distortion stability: | |
| according to Martens | 118°C. |
| according to ISO/R 75;A | 136°C. |
| Impact resistance: | 5.2 cm·kp/cm² |

In the examples, the Vicat temperature was determined according to DIN (German Industrial Standard) 53 460, method B; the impact resistance according to DIN 53 453 on a standardized small rod; the heat distortion stability (Martens) according to DIN 53 458 on a standardized small rod and ISO/R 75;A according to DIN 53 461.

Examples 4, 5 and 6, as well as the corresponding comparative examples demonstrate that it is possible, by means of the esterification catalysts according to the present invention, to obtain in considerably shortened polycondensations times UP resins having considerably higher molecular weights; and that the higher molecular weights, with the same type of UP resin and under the same curing conditions, influence the resin along the lines of an improved impact resistance and heat distortion stability of the cast articles.

The zirconates of the 2-alkyl-1,3-hexanediols and 2,2-dialkyl-1,3-hexanediols, produced by interesterification of the hexanediols with tetrapropyl- or tetra-n-butylzirconate have the following formula(I) in the case the molar ratio of the tetrapropyl- or tetra-n-butylzirconate to the hexanediol is 1 : 2.

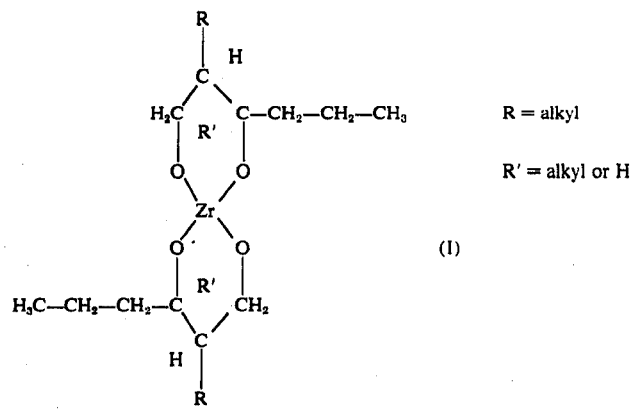

(I)

In the case, the molar ratio of the tetrapropyl- or tetra-n-butyl-zirconate to the hexanediols is 1 : > 2 the resulting zirconates cannot be exactly described by a formula. They can only be defined by their Zr content. Presumably the following mixture may be the reactive product of 1 mole tetra-n-butylzirconate with more than 2 moles of 2-alkyl-1,3-hexanediol: Mixture from

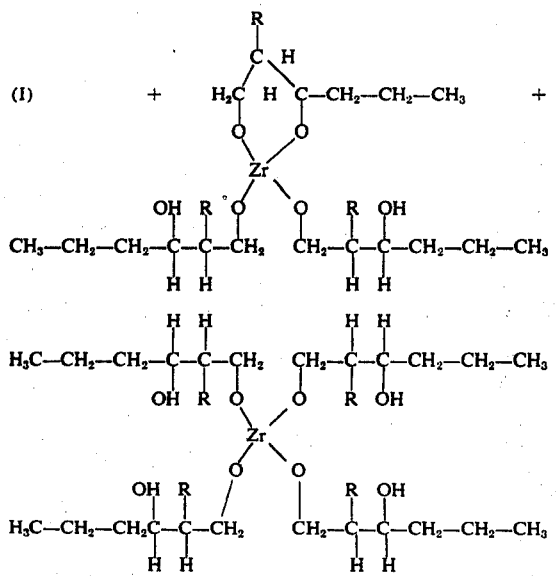

What is claimed is:

1. In a process for the production of unsaturated polyester resins derived, with respect to the acid components, from unsaturated and optionally saturated dicarboxylic acids or dicarboxylic acid mixtures, and with respect to the alcohol components, from polyhydric alcohols the improvement which comprises using, as esterification catalysts, alkali tetraphenylborates of the formula:

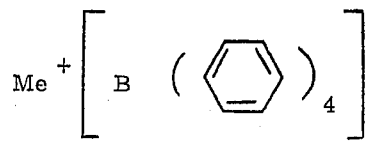

wherein $Me^+$ represents $Li^+$, $Na^+$, $K^+$, $Rb^+$, or $Cs^+$, or employing a zirconate of 2-alkyl-1,3-hexanediol or of 2,2-dialkyl-1,3-hexanediol, wherein the alkyl groups contain 1 - 4 carbon atoms.

2. The process according to claim 1, wherein a zirconate of 2-ethyl-1,3-hexanediol or 2,2-dimethyl-1,3-hexanediol is utilized as the esterification catalyst.

3. The process according to claim 1, wherein the esterification catalyst is employed in amounts of from 0.01 to 5% by weight, based on the total weight of reactants used in the polycondensation reaction.

4. The process of claim 1, wherein the esterification catalyst is employed in amounts of from 0.02 to 0.5% by weight based on the total weight of reactants used in the polycondensation reaction.

5. The process according to claim 2, wherein the esterification catalyst is employed in amounts of from 0.01 to 5% by weight, based on the total weight of the reactants used in the polycondensation reaction.

6. The process according to claim 1, wherein the esterification catalyst is employed in amounts of from 0.02 to 0.5% by weight based on the total weight of the reactants used in the polycondensation reaction.

7. The process according to claim 2, wherein the catalyst is admixed with equal proportions of the respective hexanediol or with a dihydric alcohol like ethylene glycol, 1,2-propanediol or 1,4-butanediol.

* * * * *